(12) United States Patent
Chen et al.

(10) Patent No.: US 12,554,627 B2
(45) Date of Patent: Feb. 17, 2026

(54) TESTING FRAMEWORK WITH DYNAMIC APPLICABILITY MANAGEMENT

(71) Applicant: Visa International Service Association, San Francisco, CA (US)

(72) Inventors: Yuexi Chen, Foster City, CA (US); Marc Kekicheff, Foster City, CA (US); Jin Xu, Singapore (SG); Cecilia Yusman, Singapore (SG); Kiat Chun Tan, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 340 days.

(21) Appl. No.: 18/312,826

(22) Filed: May 5, 2023

(65) Prior Publication Data
US 2024/0370355 A1    Nov. 7, 2024

(51) Int. Cl.
*G06F 11/3668* (2025.01)
*G06F 11/3698* (2025.01)

(52) U.S. Cl.
CPC ...... *G06F 11/3688* (2013.01); *G06F 11/3676* (2013.01); *G06F 11/3684* (2013.01); *G06F 11/3698* (2025.01)

(58) Field of Classification Search
CPC ............................................ G06F 11/36–3698
See application file for complete search history.

(56) References Cited

U.S. PATENT DOCUMENTS

| | | | | |
|---|---|---|---|---|
| 9,069,901 | B2 * | 6/2015 | Varadharajan | G06F 11/3672 |
| 9,658,848 | B2 * | 5/2017 | Bragg, Jr. | G06F 8/71 |
| 9,898,392 | B2 * | 2/2018 | Splichal | G06F 11/3672 |
| 11,157,393 | B2 * | 10/2021 | Szerenyi | G06F 11/3688 |
| 11,249,878 | B2 | 2/2022 | Patel et al. | |
| 11,636,025 | B2 * | 4/2023 | Neumann | G06F 11/3688 717/124 |
| 2012/0047489 | A1 * | 2/2012 | Varadharajan | G06F 11/3672 717/124 |
| 2013/0198567 | A1 | 8/2013 | Ahmed et al. | |
| 2016/0350107 | A1 * | 12/2016 | Bragg, Jr. | H04L 67/10 |
| 2017/0249240 | A1 * | 8/2017 | Splichal | G06F 11/3672 |
| 2019/0377663 | A1 * | 12/2019 | Szerenyi | G06F 11/3672 |
| 2022/0365870 | A1 * | 11/2022 | Neumann | G06F 11/3698 |

* cited by examiner

*Primary Examiner* — Todd Aguilera
(74) *Attorney, Agent, or Firm* — Kilpatrick Townsend & Stockton LLP

(57) ABSTRACT

Embodiments of the invention are directed to systems, methods, and devices for providing dynamic applicability management with respect to a testing framework. Executable code segments can be provided in/with various test procedures that include instructions for testing hardware, software, capabilities, features, functionalities, or protocols of a computing device. Each code segment can encapsulate logic that, when executed, identifies whether a corresponding test procedure is applicable to a device given that device's configuration. By executing each code segment, a set of applicable test procedures can be identified. Identifiers or the test procedures may be provided to the device to be tested or a testing platform configured to conduct the test of that device. Transmitting the identifiers and/or procedures configures those devices to perform the test through simulating a legitimate data exchange.

19 Claims, 9 Drawing Sheets

```
DeviceConfig: {
    DeviceCapability: {
        Feature1ASupported: true,      ← 302A
        Feature1BSupported: true,      ← 302B
        Feature1CSupported: true,      ← 302C
        Feature1DSupported: false      ← 302D
    },
    TransactionTypeCapability : {
        TransactionType1Supported: false,    ← 302E
        TransactionType2Supported: false,    ← 302F
        TransactionType3Supported: false     ← 302G
    },
    VerificationMethod: {
        VerificationMethod1Supported: true,   ← 302H
        VerificationMethod2Supported: false   ← 302I
    },
    DataAuthentication: {
        TextSize: '248',                      ← 302J
        CertificateRevocationSupported: true  ← 302K
    }
    ...
}
```

```
402 {
    Boolean isApplicable(object DeviceConfig) {
        if (DeviceConfig.DataAuthentication.TextSize == '248') {return true;}
        else {return false;}
    }

404 {
    Boolean isApplicable(object DeviceConfig) {
        if (DeviceConfig.DeviceCapability.Feature1BSupported == true ||
            DeviceConfig.DeviceCapability.Feature1CSupported == true) {return true;}
        else {return false;}
    }

406 {
    Boolean isApplicable(object DeviceConfig) {
        if (DeviceConfig.DeviceCapability.Feature1BSupported == true ||
            DeviceConfig.DeviceCapability.Feature1DSupported == true) {return true;}
        else {return false;}
    }

408 {
    Boolean isApplicable(object DeviceConfig) {
        if (DeviceConfig.DeviceCapability.Feature1CSupported == true ||
            DeviceConfig.DeviceCapability.Feature1DSupported == true ) {return true;}
        else {return false;}
    }

410 {
    Boolean isApplicable(object DeviceConfig) {
        if (DeviceConfig.DeviceCapability.Feature1DSupported == true) {return true;}
        else {return false;}
    }

412 {
    Boolean isApplicable(object Config) {
        if (DeviceConfig.DeviceCapability.Feature1CSupported == true) {return true;}
        else {return false;}
    }

```
┌─────────────────────────────────────────────────────────────────────────────┐
│ OBTAIN A PLURALITY OF EXECUTABLE CODE SEGMENTS ASSOCIATED WITH A PLURALITY OF SOURCE CODE │
│ PROVIDERS, EACH OF THE PLURALITY OF EXECUTABLE CODE SEGMENTS BEING CONFIGURED TO RECEIVE, │
│ WHEN EXECUTED, A SET OF INPUT PARAMETERS AND OUTPUT AN INDICATION THAT A CORRESPONDING TEST │
│   PROCEDURE OF A PLURALITY OF TEST PROCEDURES IS APPLICABLE TO THE SET OF INPUT PARAMETERS │
│                                      902                                     │
└─────────────────────────────────────────────────────────────────────────────┘
                                       │
                                       ▼
┌─────────────────────────────────────────────────────────────────────────────┐
│         RECEIVE A SET OF PARAMETERS ASSOCIATED WITH A SECOND COMPUTING DEVICE │
│                                      904                                     │
└─────────────────────────────────────────────────────────────────────────────┘
                                       │
                                       ▼
┌─────────────────────────────────────────────────────────────────────────────┐
│ EXECUTE THE PLURALITY OF EXECUTABLE CODE SEGMENTS ASSOCIATED WITH THE PLURALITY OF SOURCE │
│  CODE PROVIDERS, THE PLURALITY OF EXECUTABLE CODE SEGMENTS BEING INDIVIDUALLY PROVIDED THE │
│         SET OF PARAMETERS ASSOCIATED WITH THE SECOND COMPUTING DEVICE AS INPUT │
│                                      906                                     │
└─────────────────────────────────────────────────────────────────────────────┘
                                       │
                                       ▼
┌─────────────────────────────────────────────────────────────────────────────┐
│ IDENTIFY A SUBSET OF OUTPUTS OBTAINED FROM EXECUTING THE PLURALITY OF EXECUTABLE CODE │
│ SEGMENTS, THE SUBSET OF OUTPUTS INDICATING THAT A SUBSET OF THE PLURALITY OF TEST PROCEDURES │
│          ARE APPLICABLE TO THE SET OF PARAMETERS THAT WERE PROVIDED AS INPUT │
│                                      908                                     │
└─────────────────────────────────────────────────────────────────────────────┘
                                       │
                                       ▼
┌─────────────────────────────────────────────────────────────────────────────┐
│ TRANSMIT APPLICABILITY DATA THAT IDENTIFIES THE SUBSET OF THE PLURALITY OF TEST PROCEDURES, A │
│    RECEIVING DEVICE BEING CONFIGURED TO REQUEST OR INITIATE EXECUTION OF THE SUBSET OF THE │
│                PLURALITY OF TEST PROCEDURES USING THE APPLICABILITY DATA     │
│                                      910                                     │
└─────────────────────────────────────────────────────────────────────────────┘
```

TESTING FRAMEWORK WITH DYNAMIC APPLICABILITY MANAGEMENT

BACKGROUND

In modern software development, the quality assurance task of testing various features of computing devices can be very complex. The number of test cases can reach tens of thousands or more. Test case execution typically depends on the configuration of the device being tested (e.g., what features and/or functionality is supported by the device). It may be the case that only a subset of the possible test cases are applicable to the device having a particular set of features or supporting particular functionality. Identifying which test cases are applicable to a given device is largely a manual process that is difficult to maintain as human error may cause inapplicable tests to be run or missing test coverage. Modern software is developed over time, resulting in new test cases continuously being added. This in turn adds to the complexity of identifying and/or maintaining knowledge of which test cases are applicable to a given device.

Embodiments of this disclosure address these and other problems, individually and collectively.

SUMMARY

One embodiment of the invention is directed to a method. The method may comprise obtaining, by a first computing device, a plurality of executable code segments associated with a plurality of source code providers. In some embodiments, each of the plurality of executable code segments may be configured to receive, when executed, a set of input parameters and output an indication that a corresponding test procedure of a plurality of test procedures is applicable to the set of input parameters. The method may comprise receiving, by the first computing device, a set of parameters associated with a second computing device. The method may comprise executing, by the first computing device, the plurality of executable code segments associated with the plurality of source code providers. In some embodiments, the plurality of executable code segments may be individually provided the set of parameters associated with the second computing device as input. The method may comprise identifying, by the first computing device, a subset of outputs returned from executing the plurality of executable code segments. In some embodiments, the subset of outputs may indicate that a subset of the plurality of test procedures are applicable to the set of parameters that were provided as input. The method may comprise transmitting, by the first computing device, applicability data that identifies the subset of the plurality of test procedures. In some embodiments, a receiving device may be configured to request or initiate execution of the subset of the plurality of test procedures using the applicability data.

Another embodiment of the invention is directed to a management device comprising one or more processors and one or more memories. The one or more memories may store computer-executable instructions that, when executed by the one or more processors, causes the management device to perform operations. The operations may comprise any suitable operations discussed in connection with the methods disclosed herein.

Another embodiment of the invention is directed to a computing device comprising one or more processors and one or more memories. The one or more memories may store computer-executable instructions that, when executed by the one or more processors, causes the computing device to perform operations. The operations may comprise any suitable operations discussed in connection with the methods disclosed herein.

Another embodiment of the invention is directed to a testing platform computer comprising one or more processors and one or more memories. The one or more memories may store computer-executable instructions that, when executed by the one or more processors, causes the testing platform computer to perform operations. The operations may comprise any suitable operations discussed in connection with the methods disclosed herein.

Further details regarding embodiments of the invention can be found in the Detailed Description and the Figures.

BRIEF DESCRIPTION OF THE DRAWINGS

FIG. 3 is a schematic of an exemplary device configuration, according to some embodiments.

FIG. 4 is a schematic of exemplary code segments, according to some embodiments.

FIG. 9 shows a block diagram illustrating another method for providing dynamic applicability management within a testing framework, according to some embodiments.

DETAILED DESCRIPTION

Figure 1:
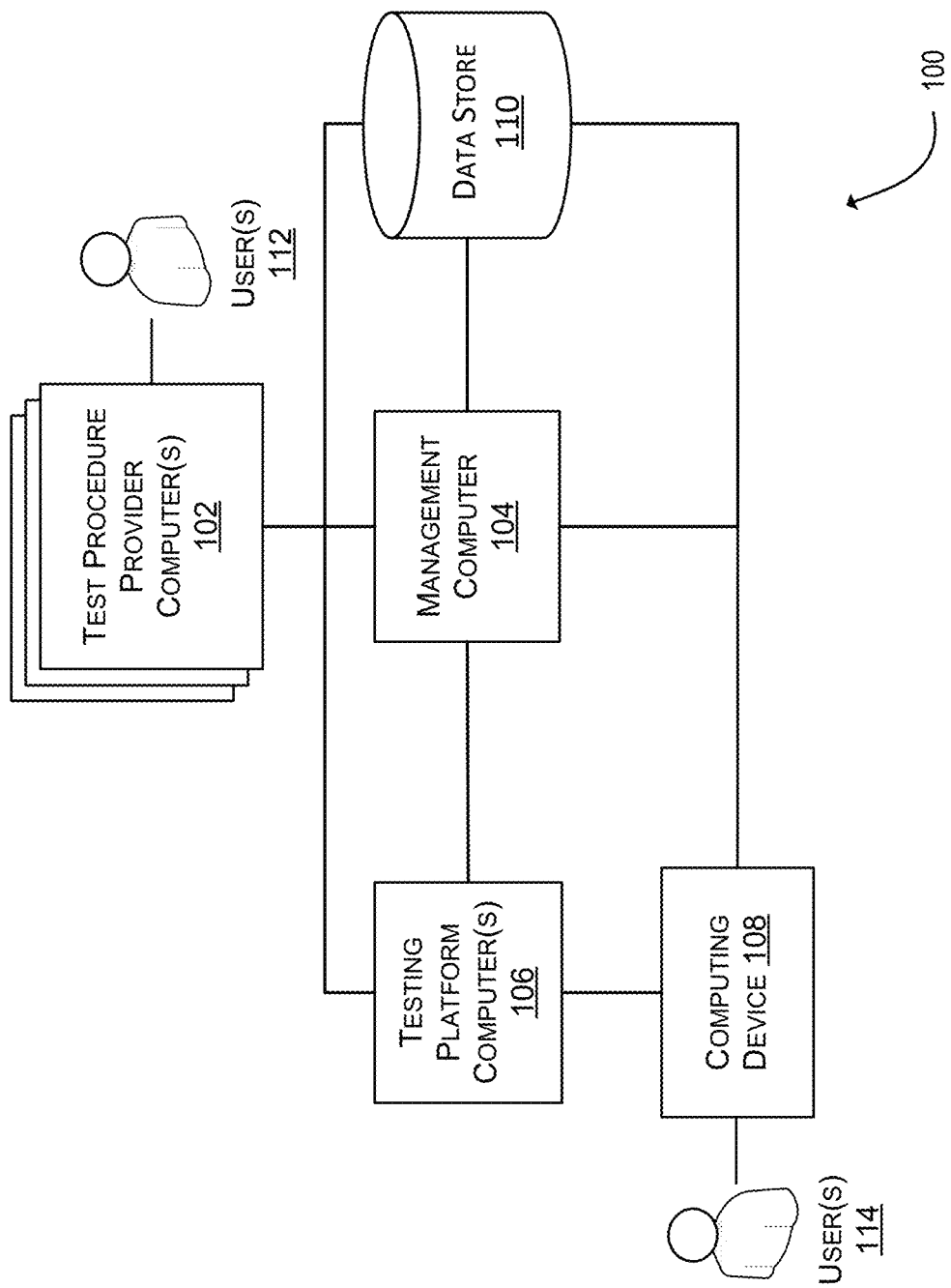
FIG. 1 shows a block diagram of a system for implementing dynamic applicability management, according to some embodiments.

Embodiments of the present invention are directed to providing dynamic applicability management of test procedures within a testing framework. In some embodiments, the tests may be related to testing various features, functionality, protocols, hardware, and/or software of a particular computing device having a particular configuration.

Two or more entities may utilize one or more test procedure providers to generate test procedures that provide test data with which a set of instructions for testing device functionality may be identified. A test procedure may include, among other things, an executable code segment that is configured to, when executed, receive a set of input parameters and output an indication that a corresponding test procedure is applicable or unapplicable to a given computing device to be tested. The set of input parameters may correspond to a device configuration associated with a device to be tested and may indicate the presence of particular hardware, software, features, protocols, or functionality purported to be supported by the device to be tested. By utilizing the disclosed techniques, a testing framework can dynamically manage and determine testing procedure applicability at run time to ensure that all and only tests that relate to the hardware, software, features, functionality, protocols, or capabilities of a given device are performed. The disclosed techniques provide improvements over conventional systems by reducing, if not eliminating, the wasteful processing of inapplicable tests by tested devices and testing platforms, while ensuring that all applicable tests are performed, reducing the risk of lacking test coverage.

Prior to discussing specific embodiments of the invention, some terms may be described in detail.

The term "computing device" generally refers to a device that performs computations. A computing device may be configured to communicate within a network via wired or wireless connections. Example networks may include public/private networks such as local area networks, virtual private networks, and/or the Internet, data networks such as 3G, 4G, or similar networks, and the like. Examples of computing devices include mobile phones (e.g., cellular phones), PDAs, tablet computers, access devices, net books, laptop computers, personal music players, media players, streaming devices, hand-held specialized readers, smart televisions, etc. Further examples of computing devices include wearable devices, such as smart watches, fitness bands, ankle bracelets, rings, earrings, etc., as well as automobiles with remote communication capabilities. A computing device may comprise any suitable hardware and software and may also include multiple devices or components (e.g., when a device has remote access to a network by tethering to another device—i.e., using the other device as a modem—both devices taken together may be considered a single user device).

A "management computer" may include one or more computing devices that are configured to manage data. In some embodiments, the management computer can be a large mainframe, a minicomputer cluster, or a group of server computers functioning as a unit. A management computer may be configured to communicate within a network with other computers/computing devices via wired or wireless connections. Example networks may include public/private networks such as local area networks, virtual private networks, and/or the Internet, data networks such as 3G, 4G, or similar networks, and the like. The management computer may be coupled to one or more databases and may include any hardware, software, other logic, or combination of the preceding, for servicing requests from one or more client computers. The management computer may comprise one or more computational apparatuses and may use any of a variety of computing structures, arrangements, and compilations for servicing the requests from one or more client computers/applications. In some embodiments, the management computer may be configured to manage test data on behalf of one or more entities and/or provided by one or more test procedure providers.

A "test procedure provider computer" may be one or more computers associated with a test procedure provider. A "test procedure provider" may refer to a provider of one or more test procedures. A test procedure provider computer may be configured to communicate within a network with other computers/computing devices via wired or wireless connections. Example networks may include public/private networks such as local area networks, virtual private networks, and/or the Internet, data networks such as 3G, 4G, or similar networks, and the like. The test procedure provider computer may be coupled to one or more databases and may include any hardware, software, other logic, or combination of the preceding, for servicing requests from one or more client computers. The test procedure provider computer may comprise one or more computational apparatuses and may use any of a variety of computing structures, arrangements, and compilations for servicing the requests from one or more client computers/applications. In some embodiments, a test procedure provider may be used to provide one or more test procedures on behalf of a separate entity (e.g., a financial institution such as a bank or credit card company, a streaming service, an online website, or the like).

A "test procedure" may be more generically referred to as "test data" in examples included herein. A test procedure may include one or more code segments (e.g., code segments configured to determine applicability of a given test procedure with respect to a given device configuration), configuration data indicating a configuration for one or more devices to be used to test hardware, software, features, or functionality of a computing device, a set of rules and/or instructions for testing the computing device, one or more expected outcomes of a test (e.g., one or more expected output values and the like). A test procedure may define the organization or structure of data and may be in any suitable format. For example, a schema may be provided in a mark up language such as XML to define an object, a data type/structure, an application interface, configuration values, expected behavior and/or outcome/output, one or more messages and/or corresponding values to be transmitted, one or more messages and/or corresponding values to be received, computations, formulas, or the like. In some embodiments, a command/response sequence of data and/or messages to be exchanged between a testing device and a device to be tested may be identified from the test data. In some embodiments, the test procedure may include machine-readable data and/or a set of instructions to be executed by one or more devices (e.g., a testing device and/or a device to be tested) during execution of a test procedure. In some embodiments, the set of instructions may be derived (e.g., by a computing device, by a testing platform computer, etc.) from the test procedure. In some embodiments, executing a test may be referred to as a "simulation" in which two or more devices simulate real-time device execution of the device being tested. A test (e.g., a simulation) may include initializing and/or configuring one or more testing device(s) and/or a device being tested, executing one or more instructions, transmitting/receiving one or more messages over a network or directly between devices, receiving and/or validating data provided by the device being tested, and the like.

A "testing platform computer" may include one or more computing devices of a testing platform. In some embodiments, a testing platform computer can be a large mainframe, a minicomputer cluster, or a group of server computers functioning as a unit. A testing platform computer may be configured to communicate within a network with other computers/computing devices via wired or wireless connections. Example networks may include public/private networks such as local area networks, virtual private networks, and/or the Internet, data networks such as 3G, 4G, or similar networks, and the like. The testing platform computer may be coupled to one or more databases and may include any hardware, software, other logic, or combination of the preceding, for servicing requests from one or more computing devices. The testing platform computer may comprise one or more computational apparatuses and may use any of a variety of computing structures, arrangements, and compilations for servicing the requests from one or more client computers/applications. In some embodiments, the testing platform computer may be configured to execute, with one or more computing devices, a simulation that tests any suitable combination of hardware, software, features, or functionality of the computing device. In some embodiments, a testing platform computer may be configured to obtain test data and execute one or more operations/instructions for performing a test of a computing device.

An "entity" may include an individual, a company, a financial institution, a streaming service, a software provider, a website provider, a payment processor, or the like.

An "application programming interface" (API) may be an interface or communication protocol between a client and a server. In some embodiments, an application programming interface may define formats for specific requests and corresponding responses. An API can take many forms, but can often include specifications for routines, data structures, object classes, variable, or remote calls. An API may be for a web-based system, an operating system, a database system, computer hardware, or a software library, to name a few.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

"Payment credentials" may include any suitable information associated with an account (e.g., a payment account and/or payment device associated with the account). Such information may be directly related to the account or may be derived from information related to the account. Examples of account information may include a PAN (primary account number or "account number"), username, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a username, an expiration date, a gift card number or code, and any other suitable information.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services or provide access to goods or services. A resource provider may operate a computer to perform operations, which can also be generically referred to as a "resource provider computer".

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate a computer to perform operations, which can also be generically referred to as an "authorizing entity computer".

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "transaction data" including, by way of example only: a service code, a CVV (card verification value), a dCVV (dynamic card verification value), a PAN (primary account number or "account number"), a payment token, a username, an expiration date, etc. The authorization request message may include additional "transaction data," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization. As noted above, in some embodiments, a transaction processing computer may generate or forward the authorization response message to the merchant.

Identifying which test procedures are applicable to a given computing device to be tested (e.g., computing device 108) is not a trivial task. Conventionally, entities and/or test providers would provide textual explanations describing what hardware, software, features, and/or functionality to which a given test procedure was applicable. These textual explanations would be interpreted by a human and encoded in a variety of rules, typically maintained in a centralized database. This invited human error as the actors interpreting these texts and generating rules therefrom, were usually different from the user(s) 112 who wrote the test procedure. Errors in these rules led to wasteful use of processing resources when tests that were intended to test aspects of a device (e.g., hardware, software, features, functionality, etc.) were performed on devices that were not configured with those aspects. Additionally, or alternatively, rule errors led to insufficient test coverage where aspects of the device were not tested, even though present.

To address these deficiencies in conventional testing platforms, test applicability may be encapsulated in a code segment provided within (or with) the test procedure. Each of these code segments may be configured to take as input a one or more input parameters (e.g., a device configuration indicating one or more aspects (e.g., hardware components, software components, features, or functionality) of the computing device (e.g., computing device 108)). The code segments may execute any suitable predefined operations for determining, from the input parameters, whether the corresponding test procedure is applicable to the given computing device (e.g., computing device 108). The applicable test procedures identified may be conducted (e.g., between a testing platform and a computing device to be tested) to determine whether the hardware, software, features, or functionality of the computing device are operating properly. This may be accomplished with a simulation process in which a testing platform computer simulates real-time data/interactions between the computing device being tested and a hypothetical device. The testing platform computer may simulate the data/interactions provided by the hypothetical device and assess the output/behavior of the computing device being tested to determine whether the output/behavior of the computing device is as expected (e.g., according to the expected outputs/behaviors specified by a test procedure). The outcomes of the test(s)/simulation(s) may be assessed (e.g., by the testing platform computer) to determine that the computing device is, or is not, operating properly.

FIG. 1 shows a block diagram of a system 100 for implementing dynamic applicability management for one or more test procedures and/or tests/simulations, according to some embodiments. The system 100 may include one or more test procedure provider computer(s) (e.g., test procedure provider computer(s) 102), one or more management computers (e.g., management computer 104), one or more testing platform computers (e.g., testing platform computer(s) 106), and one or more computing devices (e.g., computing device 108). In some embodiments, data store 110 may represent separate data stores (e.g., a distributed data store) or a combined data store. In some embodiments, data store 110 may be configured to store test data (e.g., test procedures corresponding to one or more test procedures provided by test procedure provider computer(s) 102). The computers, devices, and data stores depicted in FIG. 1 may communicate with one another over any suitable number of public and/or private networks (e.g., the Internet, a virtual private network, etc., not depicted).

User(s) 112 may be tasked with generating one or more test procedures on behalf of one or more entities. By way of example, user(s) 112 may generate test procedures on behalf of one or more processing network providers (e.g., VISA®, Mastercard®, American Express®, etc.), not depicted. These test procedures may individually be associated with testing hardware, software, one or more features, or functionality of a given computing device. In some embodiments, multiple test procedures may be generated for particular hardware, software, feature, or functionality, where each test procedure corresponds to a different entity. By way of example, a test procedure (e.g., test 00001) may be generated on behalf of one entity (e.g., VISA®) while another test procedure may be generated on behalf of another entity (e.g., Mastercard®). These test procedures may be used to test the same, or different, aspects of a computing device (e.g., computing device 108).

As a non-limiting example, computing device 108 may be an access device that is configured perform point-of-sale terminal processing at a merchant location. In some embodiments, the computing device 108 may be configured to interact with a portable device (e.g., a payment card such as a debit and/or credit card) to exchange transaction data and/or card data during initiation of a payment transaction. It should be appreciated that some examples are provided in the space of payment transactions. These examples are intended to be illustrative only and do not limit the scope of this disclosure. Three test procedures may be generated to test any suitable combination of hardware, software, features, or functionality of the computing device 108. By way of example, these test procedures may be directed to testing a magnetic stripe reader and/or data exchanged between a portable device (not depicted) and the computing device 108. In some embodiments, each of the example test procedures may be generated by user(s) 112 on behalf of different entities (e.g., VISA®, Mastercard®), and American Express®, respectively). In some embodiments, the content of the test procedures may differ.

The test procedure provider computer(s) 102 may be utilized to provide these test procedures to management computer 104 and/or data store 110 over any suitable network (e.g., the Internet). If received by the management computer 104, management computer 104 may be configured to provide the test procedures to data store 110. Data store 110 may be any suitable storage device configured to store any suitable number of test procedures. In some embodiments, the three test procedures may be stored with tens, hundreds, even thousands of test procedures.

As described above, test applicability may be encapsulated in a code segment provided within (or with) the test procedure. Each of these code segments may be configured to take as input a one or more input parameters (e.g., a device configuration indicating one or more aspects (e.g., hardware components, software components, features, or functionality) of the computing device (e.g., computing device 108)). The code segments may execute any suitable predefined operations for determining, from the input parameters, whether the corresponding test procedure is applicable to the given computing device (e.g., computing device 108).

Figure 2:
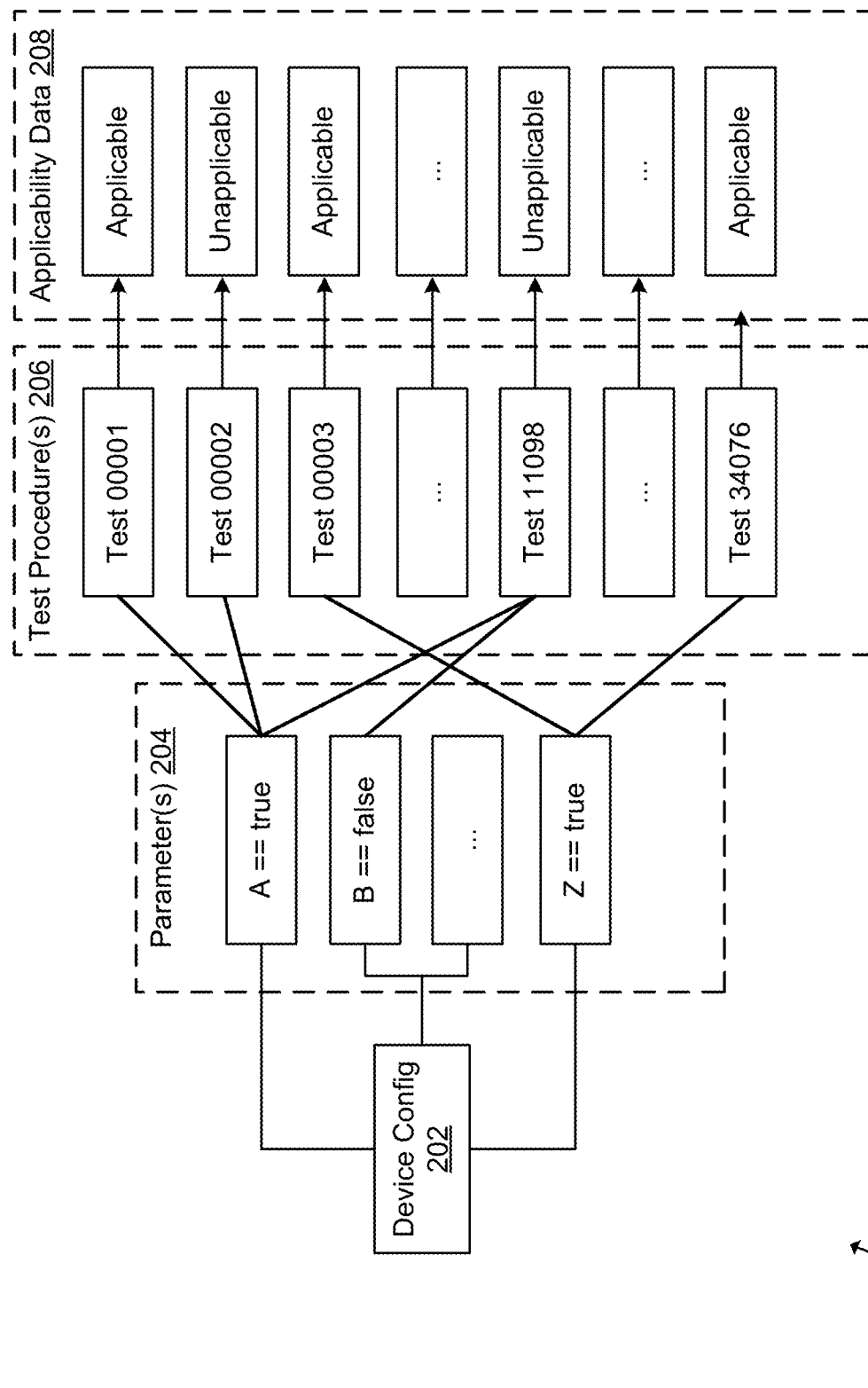
FIG. 2 shows a block diagram illustrating exemplary test applicability with respect to an example device configuration, according to some embodiments.

FIG. 2 shows a block diagram 200 illustrating exemplary test applicability with respect to an example device configuration (e.g., device config 202), according to some embodiments. The device config 202 may include any suitable number of parameters (e.g., parameter(s) 204) that individually indicate an aspect of a computing device. By way of example, each parameter may indicate existence of a hardware or software component, or the parameter may indicate that the computing device a particular feature or particular functionality. An example, device configuration is discussed in more detail with respect to FIG. 3.

The parameter(s) 204 may be utilized to identify which, if any, test procedure(s) 206 are applicable to the hardware, software, features, or functionality of the device associated with device config 202. Test procedure(s) 206 may be examples of the test procedure(s) generated by user(s) 112 and provided by test procedure provider computer(s) 102 of FIG. 1. As depicted in FIG. 2, a test procedure may relate to a hardware component, a software component, a feature, or functionality of a computing device to be tested (e.g., computing device 108 of FIG. 1). In some embodiments, test procedure(s) 206 may include one or more executable functions that may be utilized to generate applicability data 208. A number of example functions are provided and described in more detail in connection with FIG. 4.

In some embodiments, applicability data 208 may be any data that indicates a given test's applicability with respect to a device having a configuration corresponding to device config 202. Applicability data 208 may be in any suitable form. By way of example, applicability data 208 may include values (e.g., return values, output, etc.) generated using test procedure(s) 206 (e.g., via execution of a function provided within test procedure(s) 206. Applicability data 208 may include any data such as an indicator that a test is applicable or unapplicable to the device config 202 (e.g., according to the parameter(s) 204).

FIG. 3 is a schematic of an exemplary device configuration (e.g., device configuration 300), according to some embodiments. Device configuration 300 may be an example of the device config 202 of FIG. 2. Device configuration 300 may include any suitable number of parameters (e.g., parameters 302A-302K, collectively referred to as "parameters 302"), each an example of parameter(s) 206 of FIG. 2). As a non-limiting example, parameters 302 includes 11 parameters, grouped in four different parameter groups (parameter groups 324-330). It should be appreciated that parameters 302 may include any suitable number of parameters, ungrouped, or grouped according to any suitable number of parameter groups.

As depicted, parameter group 324 includes four parameters (e.g., parameters 302A-D), parameter group 326 includes three parameters (e.g., parameters 302E-G), parameter group 328 includes 2 parameters (e.g., parameters 302H and 302I), and parameter group 330 includes 2 parameters (e.g., parameters 302J and 302K). As a non-limiting example, the parameters 302A-D relate to features that are/are not supported by the corresponding device.

As an example, device configuration 300 may indicate a configuration for an access device. An access device can be used to exchange transaction data and/or card data with a portable device at a merchant location (e.g., at a brick-and-mortar store where goods and/or services may be procured). In some embodiments, the access device may be configured to perform point-of-sale processing. Device configuration 300 may indicate one or more features and/or capabilities purported to be supported by the access device.

In some embodiments, parameters 302 may indicate one or more device capabilities. For example, parameters 302A-D may relate be a group (set) of terminal capabilities supported by the access device. Parameter 302A may be associated with magnetic stripe support and a value of "true" may indicate that the access device is capable of processing magnetic strip data (e.g., card data received from a magnetic stripe of a debit and/or credit card), while a value of "false" may indicate the access device is not capable of processing/obtaining magnetic strip data. Parameter 302B may be associated with online capabilities and a value of "true" may indicate that the access device is capable of performing online transactions, while a value of "false" may indicate the access device may not be capable of performing online transactions. Parameter 302C may be associated with offline capabilities and a value of "true" may indicate that the access device is capable of performing offline transactions, while a value of "false" may indicate the access device may not be capable of performing offline transactions. Parameter 302D may be an indicator for indicating the access device can only perform online transactions and a value of "false" may indicate that the access device is not one that is configured to perform only online transactions and no other, while a value of "true" may indicate the access device can only perform online transactions.

In some embodiments, parameters 302 may indicate one or more transaction types supported by the device. For example, parameters 302E, 302F, and 302G may relate to transaction types that are supported/not supported by the access device. By way of example, parameter 302E may be associated with a cashback transaction, and a value of "false" may indicate the device does not support cashback transactions (e.g., transactions with which a user receives cash back as part of an additional purchase). Parameter 302F may be associated with a manual cash transaction, and a value of "false" may indicate the device does not support manual cash transactions (e.g., transactions with which a user obtains cash without an additional purchase). Parameter 302G may be associated with a refund transaction, and a value of "false" may indicate the device cannot support refund transactions (e.g., transactions with which a user is refunded an amount corresponding to a previous purchase).

In some embodiments, parameters 302 may indicate one or more verification methods supported by the device. By way of example, parameters 302H and 302I may indicate that the access device may support/not support one or more verification methods. By way of example, parameter 302H may be associated with a signature verification method, and a value of "true" may indicate the device supports signature verification methods (e.g., a verification method that includes verifying a user's signature (e.g., user(s) 114 of FIG. 1) against a previously provided signature by the same user). Parameter 302I may be associated with an online PIN verification method, and a value of "false" may indicate the device does not support an online PIN verification method (e.g., a verification method in which a user (e.g., user(s) 114) submit a PIN (e.g., a four-digit number) that is verified against a previous PIN provided by the same user).

In some embodiments, parameters 302 may indicate one or more attributes of data authentication. By way of example, parameters 302J and 302K may indicate that the access device may support/not support one or more aspects of data authentication. By way of example, parameter 302J may be associated with maximum text size needed for one or more forms of data authentication, and a value of "248" may indicate the access device's capability of processing one or more data authentication processes. Parameter 302K may be associated with a certificate revocation process associated with data authentication and a value of "false" may indicate the access device does not provide certificate revocation functionality/support.

The device configuration 300 may include any suitable parameter indicating existence/absence of a hardware component/device (e.g., a card reader, a particular processor, a graphic processing unit (GPU), existence/absent of a software component (e.g., an application, software module, etc.), support or lack thereof of a feature or specific functionality, verification methods supported, data authentication methods supported, or any suitable aspect or capability of the device.

FIG. 4 is a schematic of exemplary code segments 400, according to some embodiments. Each of the code segments 400 may be configured to take as input a set of parameters (e.g., object DeviceConfig, an example of the device configuration 300 of FIG. 3) and output a value or indicator that a particular test procedure is applicable to the device to which the device set of parameters relate. Each of the code segments 400 may individually correspond to a particular test procedure (e.g., a test procedure provided by the test procedure provider computer(s) 102 of FIG. 1).

In some embodiments, a code segment (e.g., code segment 402) may refer to one or more of the set of parameters of the device config. By way of example, code segment 402 may evaluate whether a parameter value of a particular parameter (e.g., parameter DataAuthentication.TextSize, corresponding to parameter 302J of the device configuration 300 of FIG. 3) is equal to, greater than, or less than a particular value. For example, code segment 402 evaluates whether parameter 302J is equal to the value "248." If so, a value of "true" (e.g., Boolean value '1') is returned. If no, a value of "false" (e.g., Boolean value '0') is returned. The return value of code segment 402 indicates whether a particular test procedure (e.g., a test procedure that includes code segment 402) is applicable or unapplicable to a given device (e.g., a device such as computing device 108 of FIG. 1 corresponding to the device configuration 300 of FIG. 3). A value of "true" may be used to indicate that the test procedure is applicable (e.g., the test procedure should be run) and a value of "false" may be used to indicate that the test procedure is unapplicable (e.g., the test procedure should not be run).

As another example, code segment 404 may evaluate whether another/different test procedure is applicable/unapplicable to a given device configuration (e.g., device configuration 300). Code segment 404 may determine the corresponding test procedure is applicable if either Feature1BSupported (e.g., corresponding to parameter 302B of FIG. 3) is associated with a value of "true," or the Feature1CSupported (e.g., corresponding to parameter 302C of FIG. 3) is associated with a value of "true." If neither of the parameters Feature1BSupported and Feature1CSupported are associated with a value of "true," the code segment 404 may be configured to return a value of "false," indicating the test procedure is not applicable (e.g., the test procedure should not be run).

Code segments 400 (e.g., code segments 402, 404, 406, 408, 410, and 412) are intended for illustrative purposes only. It should be appreciated that any suitable number of parameters and/or program logic may be utilized within a given code segment to determine whether a given test procedure is applicable or unapplicable to a particular device having the device configuration provided as input.

Returning to FIG. 1, at any suitable time, a device (e.g., computing device 108, testing platform computer(s) 106, etc.) may transmit a device configuration (e.g., device configuration 300 of FIG. 3, corresponding to the configuration of computing device 108) to management computer 104. Management computer 104 may be configured to access previously stored test procedures (associated with/including corresponding code segments 400 of FIG. 4) stored within data store 110. Management computer 104 may be configured to execute each of the code segments provided within the test procedures to obtain a set of output values indicating which test procedures are applicable or unapplicable to the given device configuration.

In some embodiments, the management computer 104 may be configured to identify a subset of the output values that indicate which test procedures that are applicable to the given device configuration of computing device 108. Identifiers of the test procedures corresponding to this subset may be provided to the device(s) which initially provided the device configuration to be evaluated (e.g., testing platform computer(s) 106, computing device 108). In some embodiments, the management computer 104 can provide the test procedures corresponding to the applicable subset to any suitable device (e.g., testing platform computer(s) 106, computing device 108), or any suitable device (e.g., testing platform computer(s) 106, computing device 108) may retrieve the test procedures corresponding to the subset from local memory (if previously stored locally) or from any suitable location (e.g., from data store 110 directly, or via a request to management computer 104).

The testing platform computer(s) 106 and computing device 108 may utilize the test procedures to perform one or more tests of the computing device 108 to ensure that the computing device 108 is operating properly (e.g., that the hardware, software, features, or functionality of the computing device 108 are operating/executing properly). To determine whether the computing device 108 is operating properly, the testing platform computer(s) 106 and computing device 108 may exchange data in a manner proscribed by the test procedure(s) executed. An output or behavior of the computing device 108 may be evaluated (e.g., by the computing device 108 and/or the testing platform computer(s) 106) to an expected output or behavior identified by the applicable test procedure(s). As a non-limiting example, a test procedure may specify (e.g., in machine-readable data) that testing platform computer(s) 106 is to transmit a first message with particular data field values to computing device 108 which is expected to respond with a second message with particular data field values. In some embodiments, the testing platform computer(s) 106 and/or the computing device 108 are configured to execute operations according to the test procedure(s). The test procedure itself may include a set of instructions that are executable by the testing platform computer(s) 106 and/or the computing device 108, or the test procedure may indicate machine-readable data from which the set of instructions to be executed by either device are derivable. If the computing device 108 responds with a different message or data values than specified by the test procedure, or not at all, the testing platform computer(s) 106 may be configured to determine that the computing device 108 has failed that test. The outcome of each test conducted (e.g., test procedure executed) may be provided in any suitable manner. By way of example, the testing platform computer(s) 106 may host any suitable user interface that is configured to present the outcome of each test conducted, or the outcomes may be provide using any suitable electronic method such as via email, SMS text, or the like.

By utilizing the test procedures and code segments as described in connections with FIGS. 1-4, a testing framework is provided which enables dynamic applicability management of any suitable number of test procedures. Rather than the conventional manual tasks of interpreting text and generating corresponding rules for determining applicability of a given test procedure, the disclosed techniques enable logic (e.g., conditional logic) encapsulated in a code segment provided with or within the test procedure. These code segments may be provided by the test provider, an entity that is more knowledgeable as to the applicability of a given test. Many test procedures may be added over time without requiring any changes to the underlying operations performed by the management system. When a device configuration is provided, any suitable previously provided code segment (e.g., every code segment of every previously provided test procedure) may be executed. Each code segment may be configured to include a common function name (e.g., "IsApplicable") with a common input parameter list (e.g., a device configuration) such that the management computer may loop through each test procedure, executing its corresponding function (e.g., IsApplicable function) to identify a determination as to whether the test procedure is applicable or unapplicable to a given device (e.g., according to the device configuration provided as input). These techniques reduce the risk of human error and ensure that all applicable tests are performed on the computing device to be tested, while simultaneously ensuring that unapplicable tests are not performed. This preserves processing resources of the testing platform and the computing device being tested and ensures that all hardware, software, features, or functionality for which a corresponding test procedure exists are executed.

Figure 5:
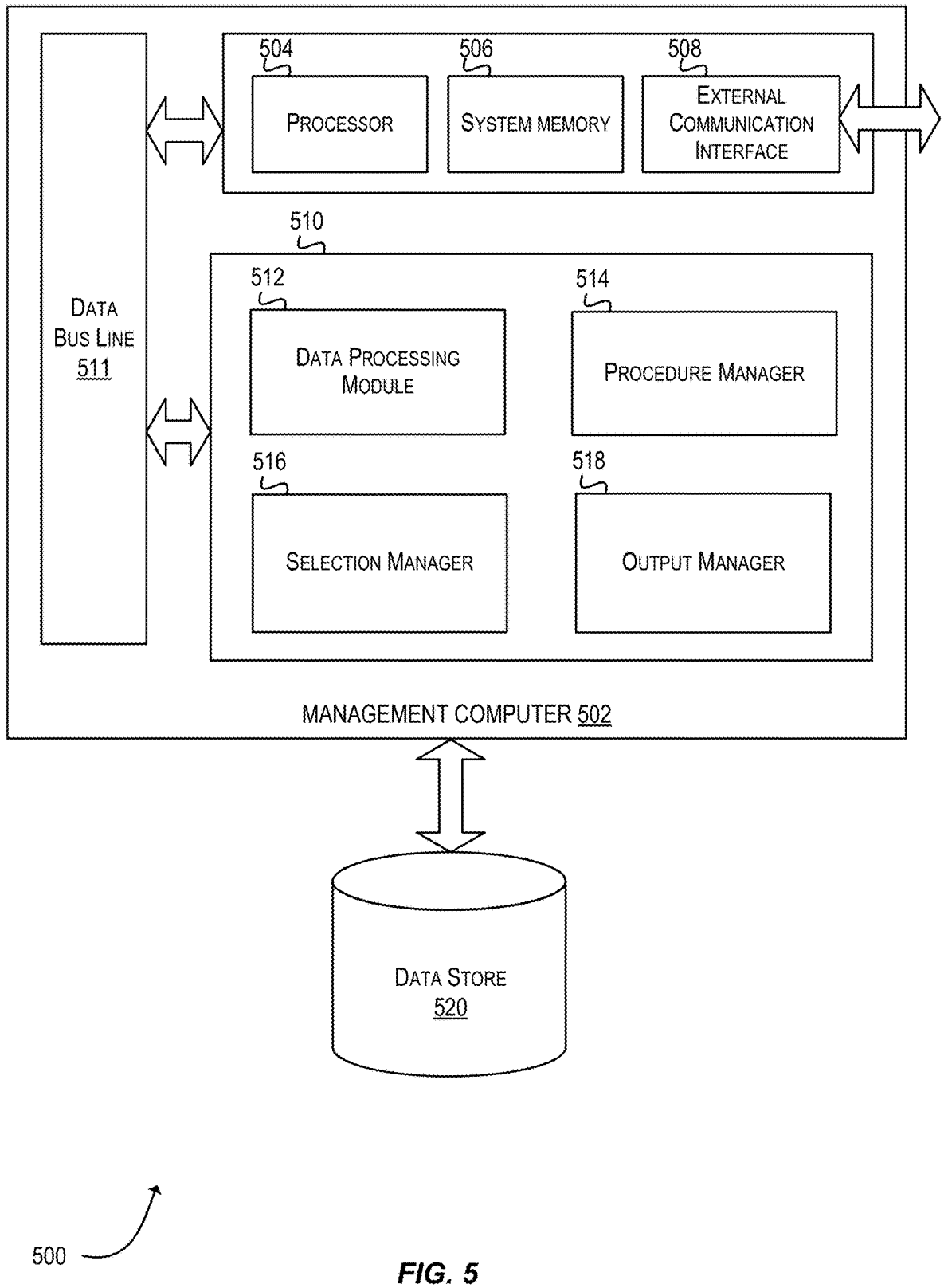
FIG. 5 shows a block diagram of an exemplary management computer, according to some embodiments.

FIG. 5 shows a block diagram of an exemplary management computer 500, according to some embodiments. The management computer 502 (e.g., an example of the management computer 104 of FIG. 1) may include a central processor 504 (e.g., one or more hardware processors). The processor 504 may be coupled to a system memory 506 and an external communication interface 508.

A computer readable medium 510 (e.g., one or more memories configured to store executable instructions) may also be operatively coupled (e.g., via data bus line 511) to the processor 504. The computer readable medium 510 may comprise software that is executable by the processor 504. For example, operations/instructions corresponding to data processing module 512, procedure manager 514, selection manager 516, and output manager 518 may each be executed by the processor 504.

In some embodiments, data store 520 (e.g., an example of data store 110 of FIG. 1) may be part of computer readable medium 510, or data store 520 may be memory separate from, but accessible to, the management computer 502. In some embodiments, any suitable combination of data processing module 512, procedure manager 514, selection manager 516, and output manager 518 may be configured to access (e.g., read, write, and/or modify) data store 520.

Data store 520 may be configured to store any suitable number of test procedures. Data store 520 may include one or more storage locations at a centralized location or distributed among different computing devices. Data store 520 may store various data structures or files, such as one or more test procedures (e.g., test procedures provided by test procedure provider computer(s) 102 of FIG. 1), code segments (e.g., code segments 400 of FIG. 4), or the like. This data may be stored in memory and/or in structured files.

The data processing module 512 may include instructions that, when executed by the processor 504 cause the management computer 502 to receive data. By way of example, the data processing module 512 may be configured to receive one or more test procedures, one or more device configurations, one or more applicability requests (e.g., requests for determining applicability of test procedures within data store 520 to a given device/device configuration), or the like. The data processing module 512 may be configured to communicate any suitable portion of the received data to any suitable combination of procedure manager 514, selection manager 516, output manager 518, or data store 520.

The procedure manager 514 may include instructions that, when executed by processor 504, cause the management computer 502 to manage one or more test procedures. As a non-limiting example, the data processing module 512 may provide a received test procedure to procedure manager 514. In some embodiments, the executed instructions of procedure manager 514 may cause the processor 504 to validate the test procedure against one or more predefined rules associated with the procedure manager 514. Execution of these validation rules may ensure that the format, syntax, and/or content of the test procedure conforms to predefined standards. As a non-limiting example, one validation rule may include checking that a given test procedure includes a code segment (e.g., a code segment similar to the code segments 400 of FIG. 4). If the test procedure does not include a corresponding code segment, the executed instructions associated with procedure manager 514 may cause the processor 504 to transmit data to output manager 518, which in turn my transmit data to the provider of the test procedure indicating the test procedure has been rejected. In some embodiments, the transmission may include a reason code or other indication that the test procedure was rejected for lacking a required code segment (e.g., an IsApplicable function similar to the code segments 400 depicted in FIG. 4). If the test procedure passes the validation process (e.g., all validation rules pass, indicating the test procedure is a valid test procedure that conforms to the predefined format, syntax, and content rules executed), the executed instructions corresponding to procedure manager 514 may cause the processor 504 to store the valid test procedure in data store 520. In some embodiments, the procedure manager 514 may include instructions that, when executed, cause the processor 504 to delete, move, or modify any suitable test procedure according to predefined deletion rules (e.g., a rule specifying that a test procedure over a threshold age is to be deleted, moved to another storage location, associated with a label indicating the staleness and/or invalidity of the test procedure, or the like).

The selection manager 516 may include instructions that, when executed by processor 504, cause the management computer 502 to select (or identify) one or more applicable test procedures from the test procedures stored in data store 520. By way of example, a device configuration may be received (e.g., as part of an applicability request message) as part of the execution of the instructions associated with data processing module 512. In some embodiments, the selection manager 516 may be configured to cause the processor 504 to access data store 520 and execute any suitable code segment therein. In some embodiments, the processor 504 may utilize a function call corresponding to each code segment. The function call within each test procedure may utilize a common identifier (e.g., a common name) such that the processor 504 may access each test procedure and execute its corresponding code segment. In some embodiments, the instructions of selection manager 516, when executed, may cause the processor 504 to provide as input a set of parameters (e.g., the received device configuration) as part of each code segment execution. This may cause the logic of each code segment to be executed by the processor 504 using the device configuration as input. Each code segment may be configured to cause an output to be determined. The output may indicate, according to the encapsulated logic of the code segment as evaluated with the device configuration parameters, a determination that the test procedure is applicable or is not applicable. In some embodiments the executed instructions of selection manager 516 may cause the processor 504 to store these outputs (along with corresponding identifiers associated with the corresponding test procedures), at least temporarily. Once all code segments within data store 520 have been executed, the executed instructions of selection manager 516 may cause the processor 504 to identify a subset of the outputs (e.g., all outputs that indicate a corresponding test procedure is applicable to the device configuration). In some embodiments, the processor 504 may cause identifiers and/or the test procedures corresponding to the subset of outputs to be transmitted in response to receiving the device configuration. The transmission of the identifiers and/or test procedures may be executed as part of executing the instructions associated with the output manager 518.

In some embodiments (e.g., when the identifiers of the test procedures that were determined to be applicable are transmitted), a request for one or more test procedures may be received and processed as part of the execution of the instructions associated with the data processing module 512. The request may include any suitable number of test procedure identifiers. In some embodiments, the identifiers may be passed to be processed according to the instructions associated with the selection manager 516. Processing these instructions with the provided identifiers may cause the processor 504 to retrieve the test procedures corresponding to the provided identifiers and transmit, according to the instructions associated with output manager 518, to the requesting device.

The particular modules and managers depicted in FIG. 5 are intended for illustrative purposes only. The functionality discussed above in connection with these components can be differently combined or separated into a fewer or a greater number of components without diverging from the scope of this disclosure.

Figure 6:
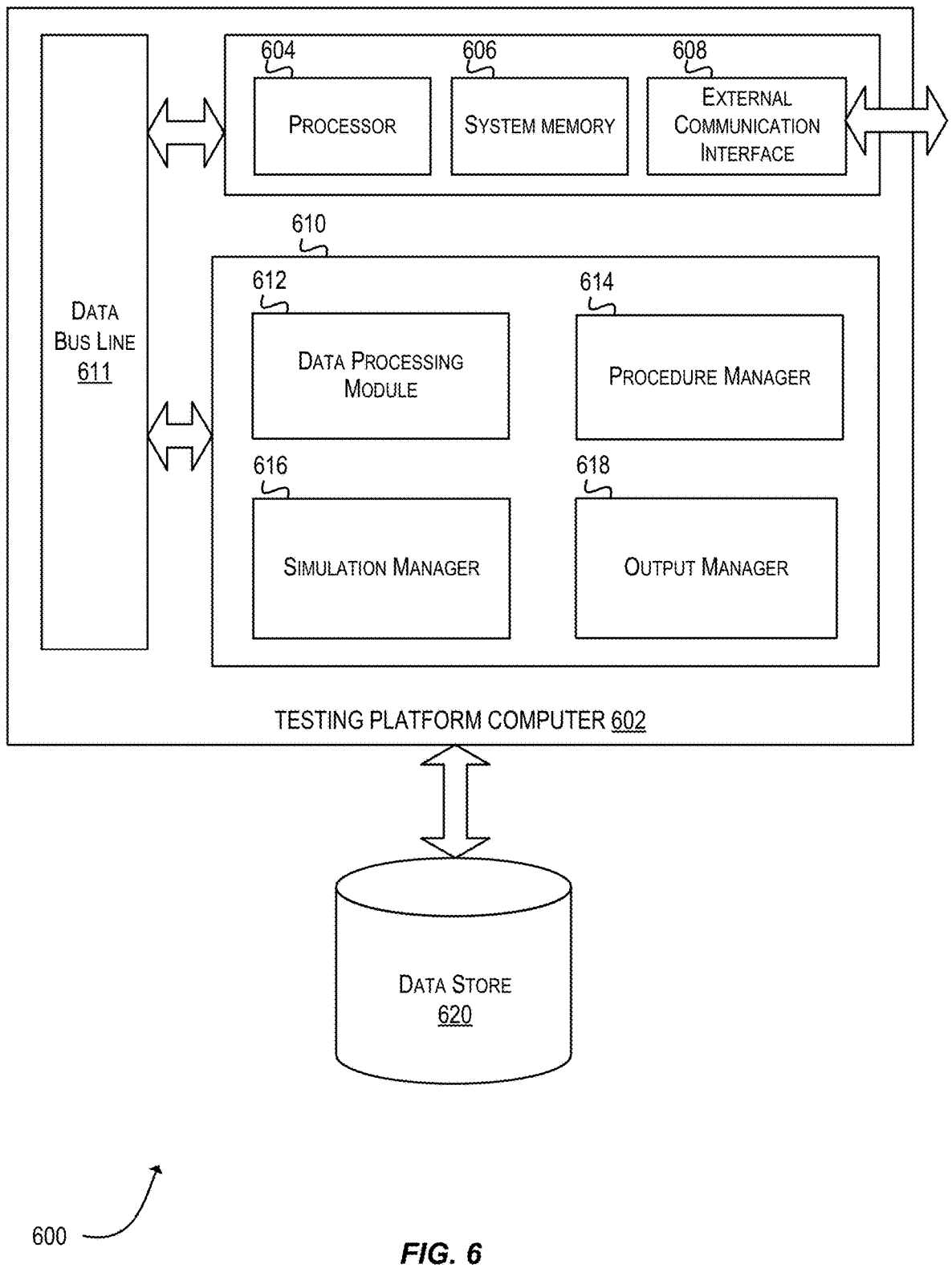
FIG. 6 shows a block diagram of an exemplary testing platform computer, according to some embodiments.

FIG. 6 shows a block diagram 600 of an exemplary testing platform computer 602, according to some embodiments. The testing platform computer 602 (e.g., an example of the testing platform computer(s) 106 of FIG. 1) may include a central processor 604 (e.g., one or more hardware processors). The processor 604 may be coupled to a system memory 606 and an external communication interface 608 (e.g., a wired and/or wireless network interface for communicating with other devices via one or more wired/wireless networks).

A computer readable medium 610 (e.g., one or more memories configured to store executable instructions) may also be operatively coupled (e.g., via data bus line 611) to the processor 604. The computer readable medium 610 may comprise software that is executable by the processor 604. For example, operations/instructions corresponding to data processing module 612, procedure manager 614, simulation manager 616, and output manager 618 may each be executed by the processor 604.

In some embodiments, data store 620 (e.g., an example of data store 110 of FIG. 1) may be memory separate from, but accessible to, the testing platform computer 602. In other embodiments, data store 620 is not directly accessible to testing platform computer 602, but data may be retrievable via requests made to management computer 502 of FIG. 5. In some embodiments, any suitable combination of data processing module 612, procedure manager 614, simulation manager 616, and output manager 618 may be configured to access (e.g., read, write, and/or modify) data store 620 or request data from data store 620 via testing platform computer 602.

The data processing module 612 may include instructions that, when executed by the processor 604 cause the testing platform computer to receive data. By way of example, the data processing module 612 may be configured to receive a device configuration, one or more identifiers corresponding to one or more test procedures, and/or one or more test procedures corresponding to a computing device to be tested. In situations in which a device configuration is received (e.g., a part of a testing/simulation request from computing device 108 of FIG. 1), executing the instructions associated with the data processing module 612 may cause processor 604 to execute instructions associated with the procedure manager 614 to request an applicability evaluation of the device configuration (e.g., by the management computer 502 of FIG. 5). The executed instructions associated with procedure manager 614 may cause the processor 604 to transmit the device configuration to management computer 502. Subsequently, a response to the request may be received (e.g., from the management computer 502) and processed according to the instructions associated with the data processing module 612. In some embodiments, the response may include identifiers corresponding to the test procedures that were identified as being applicable to the device configuration provided in the request. The processor 604 may execute instructions associated with the procedure manager 614 to request (e.g., via transmitting a test procedure request message including the received identifiers) the test procedures from the management computer 502, or the processor 604 may be configured to access the data store 620 to retrieve the test procedures corresponding to the received test procedure identifiers. Received and/or retrieved test procedures may be stored locally at the testing platform computer 602 and utilized during execution of the instructions corresponding to simulation manager 616. In some embodiments, executing the instructions of the procedure manager 614 may cause the processor 604 to subsequently delete the stored test procedures (e.g., after a test/simulation has been concluded and output corresponding to the test/simulation has been transmitted or stored).

The simulation manager 616 may include instructions that, when executed by processor 604, cause the testing platform computer 602 to perform one or more tests of a computing device (e.g., the computing device 108 of FIG. 1, to which the previously received device configuration) according to the previously identified/received/retrieved test procedures. In some embodiments, a set of instructions for performing a test/simulation with the computing device 108 may be included in the test procedure or may be derived according to instructions associated with the simulation manager 616. The instructions associated with the simulation manager 616 may be executed by the processor 604 to execute the set of instructions obtained/derived from the test procedure. Executing those instructions may include transmitting any suitable data to the computing device 108, receiving any suitable data from the computing device 108, and/or performing any suitable operation or evaluation on the data received from the computing device 108. As part of executing the instructions obtained/derived from the test procedure, the processor may transmit one or more data messages to the computing device 108, receive one or more data messages from the computing device 108, and/or evaluate particular data fields and corresponding values of those data fields in accordance with the test procedure. In some embodiments, the instructions associated with the simulation manager 616, when executed, cause the processor 604 to determine whether data messages, fields, or values received from the computing device 108 (the device being tested) match expected messages, fields, or values as specified within the test procedure being performed. In some embodiments, executing the instructions of the test procedure causes the testing platform computer 602 to simulate one or more hypothetical device/data interactions with the computing device 108.

In some embodiments, the processor 604 may cause outcome(s) of the test procedure(s) that were executed to be presented via one or more user interfaces provided as part of executing the instructions of the output manager 618 and/or the outcome(s) of the test procedure(s) may be transmitted to one or more devices as part of executing the instructions of the output manager 618.

The particular modules and managers depicted in FIG. 6 are intended for illustrative purposes only. The functionality discussed above in connection with these components can be differently combined or separated into a fewer or a greater number of components without diverging from the scope of this disclosure.

Figure 7:
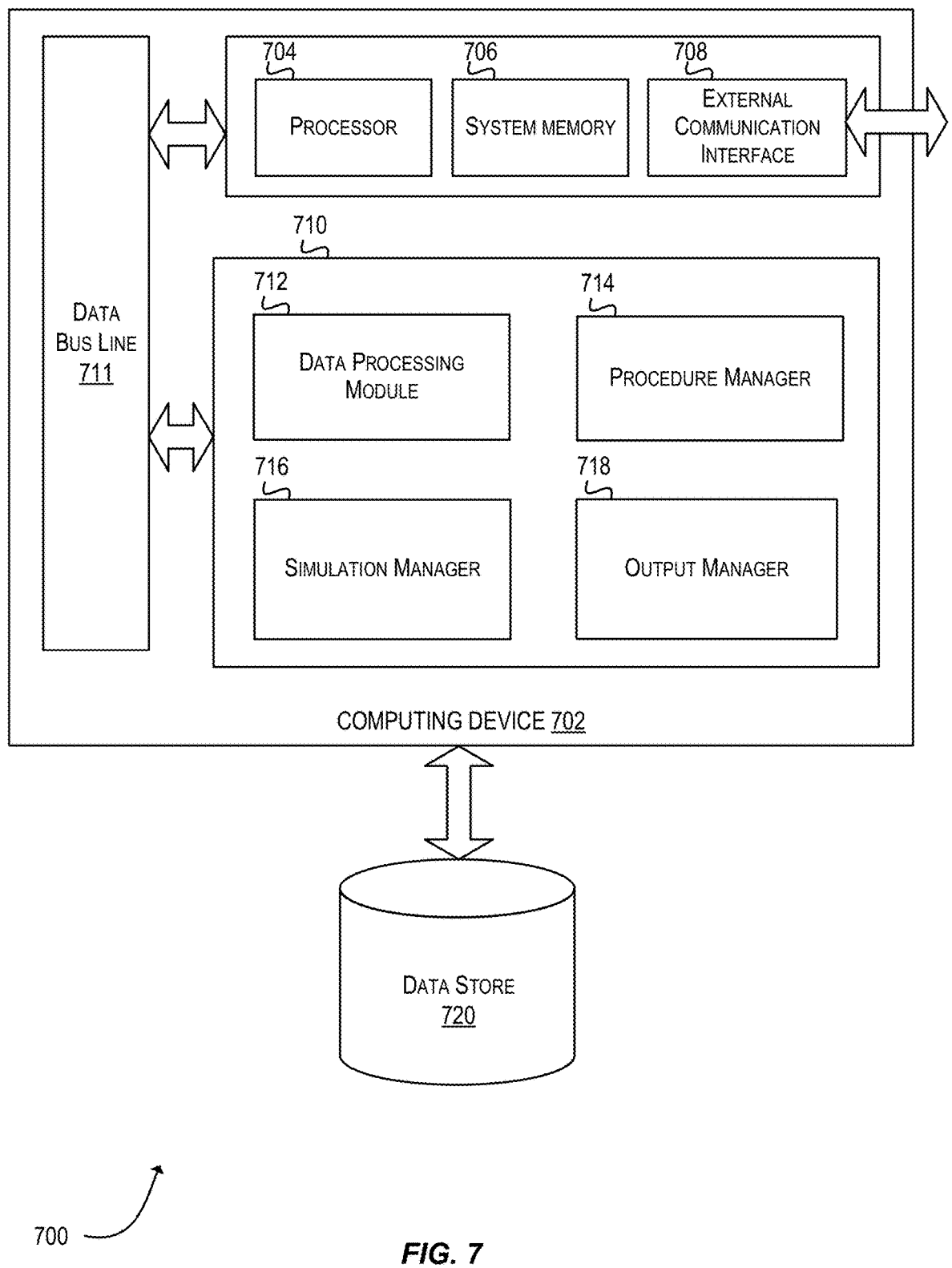
FIG. 7 shows a block diagram of an exemplary computing device, according to some embodiments.

FIG. 7 shows a block diagram 700 of an exemplary computing device 702, according to some embodiments. The computing device 702 (e.g., an example of the computing device 108 of FIG. 1) may include a central processor 704 (e.g., one or more hardware processors). The processor 704 may be coupled to a system memory 706 and an external communication interface 708 (e.g., a wired and/or wireless network interface for communicating with other devices via one or more wired/wireless networks).

A computer readable medium 710 (e.g., one or more memories configured to store executable instructions) may also be operatively coupled (e.g., via data bus line 711) to the processor 704. The computer readable medium 710 may comprise software that is executable by the processor 704. For example, operations/instructions corresponding to data processing module 712, procedure manager 714, simulation manager 716, and output manager 718 may each be executed by the processor 704.

In some embodiments, data store 720 (e.g., an example of data store 110 of FIG. 1) may be memory separate from, but accessible to, the computing device 702. In other embodiments, data store 720 is not directly accessible to computing device 702, but data may be retrievable via requests made to management computer 502 of FIG. 5. In some embodiments, any suitable combination of data processing module 712, procedure manager 714, simulation manager 716, and output manager 718 may be configured to access (e.g., read, write, and/or modify) data store 720 or request data from data store 720 via computing device 702.

The data processing module 712 may include instructions that, when executed by the processor 704 cause the computing device 702 to receive data. By way of example, the data processing module 712 may be configured to receive user input from one or more input devices (not depicted) of computing device 702. In some embodiments, the user input may be processed according to the instructions corresponding to data processing module 712 to cause processor 704 to transmit an applicability request (e.g., to management computer 502 of FIG. 5, to testing platform computer 602 of FIG. 6). Executing the instructions associated with the data processing module 712 may cause processor 704 to generate and/or retrieve from computer readable medium 710, a device configuration for computing device 702 (e.g., device configuration 300 of FIG. 3). The processor 704 may execute instructions associated with the procedure manager 714 to request an applicability evaluation of the device configuration (e.g., by the management computer 502 of FIG. 5). The executed instructions associated with procedure manager 714 may cause the processor 704 to transmit the device configuration to management computer 502 (directly, or via testing platform computer 602). Subsequently, a response to the request may be received (e.g., from the management computer 502, or testing platform computer 602) and processed according to the instructions associated with the data processing module 712. In some embodiments, the response may include identifiers corresponding to the test procedures that were identified as being applicable to the device configuration of the computing device 702. The processor 704 may execute instructions associated with the procedure manager 714 to request (e.g., via transmitting a test procedure request message including the received identifiers) the test procedures from the management computer 502 (directly, or via testing platform computer 602), or the processor 704 may be configured to access the data store 720 to retrieve the test procedures corresponding to the received test procedure identifiers. Received and/or retrieved test procedures may be stored locally at the computing device 702 and utilized during execution of the instructions corresponding to simulation manager 716. In some embodiments, executing the instructions of the procedure manager 714 may cause the processor 704 to subsequently delete the stored test procedures (e.g., after a test/simulation has been concluded and output corresponding to the test/simulation has been transmitted or stored).

The simulation manager 716 may include instructions that, when executed by processor 704, cause the computing device 702 to perform one or more tests (e.g., with testing platform computer 602) according to the previously identified/received/retrieved test procedures. In some embodiments, a set of instructions for performing a test/simulation may be included in the test procedure or may be derived according to instructions associated with the simulation manager 716. The instructions associated with the simulation manager 716 may be executed by the processor 704 to execute the set of instructions obtained/derived from the test procedure. Executing those instructions may include transmitting any suitable data to the testing platform computer 602, receiving any suitable data from the testing platform computer 602, and/or performing any suitable operation or evaluation on the data received from the testing platform computer 602. As part of executing the instructions obtained/derived from the test procedure, the processor 704 may transmit one or more data messages to the testing platform computer 602, receive one or more data messages from the testing platform computer 602, and/or evaluate particular data fields and corresponding values of those data fields in accordance with the test procedure. In some embodiments, the instructions associated with the simulation manager 716, when executed, cause the processor 704 to determine whether data messages, fields, or values received or transmitted by the computing device 702 (the device being tested) match expected messages, fields, or values as specified within the test procedure being performed.

In some embodiments, the computing device 702 may provide its device configuration to the management computer 502, receive a set of applicable test procedures and provide these identifiers and/or test procedures to the testing platform computer 602. In some embodiments, the computing device 702 may provide its device configuration in response to receiving a request (e.g., from the management computer 502, from the testing platform computer 602, etc.). In some embodiments, the computing device 702 may receive and process data (e.g., from the testing platform computer 602) as part of its normally functioning, without any indication that the data received and/or processed is being received and/or processed as part of a test/simulation with testing platform computer 602.

In some embodiments when the computing device 702 can determine the data being received and processed is part of a test/simulation, the processor 704 may cause outcome (s) of the test procedure(s) that were executed to be presented via one or more user interfaces provided as part of executing the instructions of the output manager 718 and/or the outcome(s) of the test procedure(s) may be transmitted to one or more devices as part of executing the instructions of the output manager 718.

The particular modules and managers depicted in FIG. 7 are intended for illustrative purposes only. The functionality discussed above in connection with these components can be differently combined or separated into a fewer or a greater number of components without diverging from the scope of this disclosure.

Figure 8:
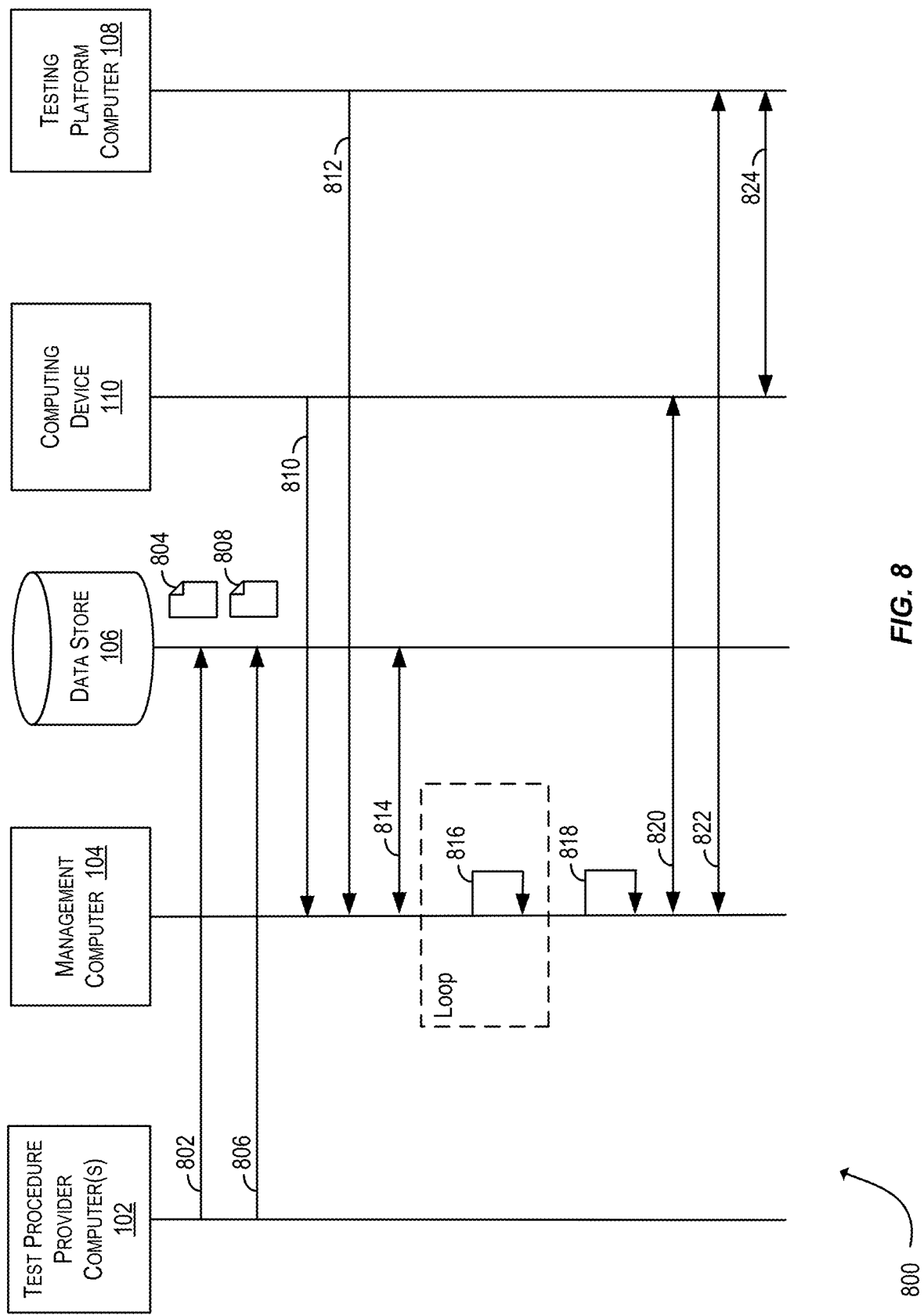
FIG. 8 shows a flow diagram illustrating a method for providing dynamic applicability management within a testing framework, according to some embodiments.

FIG. 8 shows a flow diagram illustrating a method 800 for providing dynamic applicability management within a testing framework (e.g., system 100 of FIG. 1), according to some embodiments. Method 800 may be performed with any suitable combination of the test procedure provider computer(s) 102, management computer 104, computing device 108, and testing platform computer(s) 106 of FIG. 1. Data store 110 of FIG. 1 may be utilized as part executing the operations of method 800.

As a non-limiting example, the computing device 108 may be an access device that is configured to exchange data with portable devices (e.g., a debit card, a credit card, a computing device configured with payment credentials) and initiate authorization request messages to initiate payment transactions to be processed by a payment processing network (e.g., VISA®, Mastercard®, American Express®, etc.). the access device may be configured to transmit the authorization request message to the payment processing network via a resource provider computer associated with a merchant. The payment processing network may perform any suitable processing including routing of the authorization request message to an authorizing entity corresponding to the portable device which may authorize or deny the transaction. The authorizing entity computer may generate an authorization response message that may be transmitting to the payment processing network, on to a transport computer associated with the merchant's bank, back to the resource provider computer, and finally the access device. The access device may further be configured to receive and potentially present any suitable data in an authorization response message that indicates the transaction was successful or unsuccessful. Entities (e.g., payment processing network providers such as VISA®, Mastercard®, American Express®) may have different protocols and/or processing for the same type of transactions (e.g., card present transactions, online or offline transactions, etc.). These entities may entrust test procedure providers (or these entities may be test procedure providers themselves) to generate test procedures that are configured to enable a test/simulation to be conducted that tests the access device's hardware, software, capabilities and/or ability to provide features, functionality, or processing according to the entity's specific protocol. An access device is used for illustrative purposes only. It should be appreciated that the computing device 108 may be any suitable device such as a smart television, media player, streaming device, smart phone, tablet, laptop or desktop computer, or any suitable computing device that is expected to have particular capabilities based on its device configuration (including the hardware and/or software with which the device is configured).

The method 800 may begin at 802, where test procedure provider computer(s) 102 may be utilized to provide a first test procedure (e.g., test procedure 804). As a non-limiting example, the test procedure 804 may include a set of instructions for testing/simulating data messages/exchanges corresponding to performing an online payment transaction. The test procedure 804 may include a code segment (e.g., code segment 412 of FIG. 4, associated with determining if a device configuration supports performing an online payment transaction according to a protocol associated with a first entity). In some embodiments, the test procedure 804 may be associated with a particular entity (e.g., VISA®). The test procedure 804 may specify messages, fields, or data values expected from a device being tested. In some embodiments, such as the one depicted in FIG. 8, the test procedure provider computer(s) 102 may be configured to access the data store 110 directly, while in other embodiments, the test procedure provider computer(s) 102 may be configured to provide the test procedure 804 to the management computer 104 that in turn may store the test procedure 804 within data store 110.

At 806, test procedure provider computer(s) 102 may be utilized to provide a second test procedure (e.g., test procedure 808). As a non-limiting example, the test procedure 808 may include a second set of instructions for testing/simulating data messages/exchanges corresponding to performing an online payment transaction. The test procedure 808 may include a code segment (e.g., code segment 408 of FIG. 4, associated with determining if a device configuration supports performing an online payment transaction according to a protocol associated with a second entity). In some embodiments, the test procedure 808 may be associated with a second entity (e.g., Mastercard®). The test procedure 808 may specify messages, fields, or data values expected from a device being tested. As discussed above, the test procedure provider computer(s) 102 may be configured to access the data store 110 directly to store test procedure 808, while in other embodiments, the test procedure provider computer(s) 102 may be configured to provide the test procedure 808 to the management computer 104 that in turn may store the test procedure 808 within data store 110.

At 810, an applicability request including a device configuration (e.g., the device configuration 300 of FIG. 3 corresponding to the configuration of computing device 108) may be received from computing device 108. Alternatively, the computing device 108 may transmit the device configuration to testing platform computer(s) 106.

At 812, an applicability request including a device configuration (e.g., the device configuration 300 of FIG. 3 corresponding to the configuration of computing device 108) may be received from testing platform computer(s) 106. In some embodiments, no request is transmitted to the management computer 104 at 810, in lieu of the request transmitted at 812.

At 814, the management computer 104 may access the data store 110 to access to any suitable test procedure (e.g., test procedures 804 and 808) previously stored within data store 110.

At 816, the management computer 104 may loop through every test procedure, executing each test procedures corresponding code segment. In the ongoing example, the management computer 104 may access test procedure 804 to execute code segment 412, receiving, as part of the execution of code segment 412, an output indicating that the test procedure 804 is applicable to device configuration 300 (e.g., the device configuration received at 810 and/or 812). The management computer 104, may then access the test procedure 808 to execute code segment 408, receiving, as part of the execution of code segment 408, an output indicating that the test procedure 808 is applicable to device configuration 300. Generally, any output obtained through executing the operations at 816 may indicate a given test procedure is applicable or unapplicable to a given device configuration. The operations described at 816 may be performed any suitable number of times depending on the number of test procedures stored within data store 110.

At 818, the management computer 104 may aggregate/identify all outputs received at 816 corresponding to the test procedures identified as being applicable. In some embodiments, the identifiers of the applicable test procedures may be aggregated. The outputs and identifiers indicate that the test procedure 804 and the test procedure 808 should be performed when testing a device with the device configuration received at 810 and/or 812.

At 820, the identifiers of the applicable test procedures and/or the applicable test procedures may be transmitted to computing device 108. In some embodiments, the transmission at 820 may only be performed if a request was received at 810. In other embodiments, the transmission at 820 may occur even if the request at 810 was never received (e.g., when a request was received at 812).

Similarly, at 822, the identifiers of the applicable test procedures and/or the applicable test procedures may be transmitted to testing platform computer(s) 106. In some embodiments, the transmission at 822 may only be performed if a request was received at 812. In other embodiments, the transmission at 822 may occur even if the request at 812 was never received (e.g., when a request was received at 810, in response to receiving user input indicating testing platform computer 110 is to perform tests on computing device 108, or the like). In some embodiments, the testing platform computer(s) 106 may be configured to transmit any suitable data received at 822 to the computing device 108. Although not depicted, the computing device 108 and/or the testing platform computer(s) 106 may be configured to receive identifiers of the applicable test procedures and retrieve the test procedures corresponding to those identifiers from the data store 110, from local memory, or from any suitable storage location.

At 824, the computing device 108 and the testing platform computer(s) 106 may perform any suitable number of tests/simulations in accordance with the applicable test procedures provided at 820 and/or 822 and/or retrieved from data store 110 or another suitable storage location (e.g., local memory). By way of example, the computing device 108 and/or the testing platform computer(s) 106 may execute a set of instructions from testing procedure 804 to simulate performing an online transaction according to a protocol associated with one entity (e.g., VISA®). As part of the operations performed at 824, the computing device 108 and/or the testing platform computer(s) 106 may execute a second set of instructions from testing procedure 808 to simulate performing an online transaction according to a protocol that is associated with a second entity (e.g., Mastercard®). It should be appreciated that the test procedures 804 and 808 and any other test procedure stored within data store 110 may relate to similar or different hardware, software, features, functionality, or protocols as the ones relating to test procedures 804 and 808.

FIG. 9 shows a block diagram illustrating another method 900 for providing dynamic applicability management within a testing framework, according to some embodiments. Method 900 may be performed by the management computer 502 of FIG. 5 (an example of the management computer 104 of FIG. 1).

The method 900 may begin at 902, where a plurality of executable code segments (e.g., any suitable combination of code segments 400 of FIG. 4) associated with a plurality of source code providers may be obtained. In some embodiments, the plurality of source code providers may be test procedure providers that utilize the test procedure provider computer(s) 102 of FIG. 1 to provide the executable code segments. In some embodiments, the plurality of source code providers (e.g., test procedure providers) may be associated with the same or different entities. A given test procedure of the plurality of test procedures may specify one or more configuration settings for a respective computing device that participates in a corresponding test. In some embodiments, each of the plurality of test procedures comprises corresponding machine-readable data identifying a set of instructions for performing a test or simulation. By way of example, at least one test procedure of the plurality of test procedures is associated with executing a simulation using a testing platform computer to simulate a legitimate data exchange with the computing device.

In some embodiments, each code segment may be provided in a corresponding test procedure, although in other embodiments, each code segment may be separate from the test procedure to which it corresponds. In some embodiments, each code segment shares a common function name (e.g., "IsApplicable," etc.). Each code segment may be configured to encapsulate conditional logic for determining a corresponding test procedures applicability with respect to a device configuration of the computing device, the device configuration being specified by the set of parameters. In some embodiments, each of the plurality of executable code segments may be configured to receive, when executed, a set of input parameters (e.g., the parameters of device configuration 300 of FIG. 3 which may include one or more features supported by the computing device 108) and output an indication (e.g., applicable/unapplicable, true/false, 1/0, etc.) that a corresponding test procedure of a plurality of test procedures is applicable to the set of input parameters.

At 904, a set of parameters (e.g., device configuration 300) associated with a second computing device (e.g., computing device 108 of FIG. 1) may be received. In some embodiments, the set of parameters may comprise at least one of: a hardware component, a software component, a feature, a capability, or a protocol associated with a configuration of the computing device.

At 906, the plurality of executable code segments associated with the plurality of source code providers may be executed. In some embodiments, the plurality of executable code segments may be individually provided the set of parameters associated with the second computing device as input. In some embodiments, the set of parameters are received by at least one of: the computing device to be tested (e.g., the computing device 108) or a testing platform computer (e.g., testing platform computer(s) 106) that is configured to execute one or more tests with the computing device to be tested.

In some embodiments, executing the executable code segments may further comprise accessing a first test procedure of the plurality of test procedures; executing a first code segment of the first test procedure; storing a first output obtained from executing the first code segment; accessing a second test procedure of the plurality of test procedures; executing a second code segment of the second test procedure; and storing a second output obtained from executing the second code segment.

At 908, a subset of outputs returned from executing the plurality of executable code segments may be identified. For example, the subset of outputs may be identified based on determining which outputs indicate that a subset of the plurality of test procedures are applicable to the set of parameters that were provided as input.

At 910, applicability data that identifies the subset of the plurality of test procedures may be transmitted (e.g., to the computing device 108 and/or the testing platform computer(s) 106 of FIGS. 1 and 7). In some embodiments, a receiving device (e.g., to the computing device 108 and/or the testing platform computer(s) 106) may be configured to request or initiate execution of the subset of the plurality of test procedures using the applicability data. In some embodiments, the applicability data may include identifiers of the subset of the plurality of test procedures, the subset of the plurality of test procedure, and/or one or more machine-readable data instances comprising corresponding sets of instructions that individually correspond to the subset of the plurality of test procedures, or any suitable data with which corresponding tests/simulations may be performed. In some embodiments, transmitting the one or more machine-readable data instances configures the receiving device(s) (e.g., the computing device 108 and/or the testing platform computer(s) 106) to perform a simulation that tests functionality provided by the second computing device. In some embodiments, the functionality being tested may correspond to one or more capabilities purported to be supported by the second computing device being tested (e.g., computing device 108). In some embodiments, the receiving device that receives the applicability data is a testing platform computer that initiates a test with the computing device based at least in part on receiving the applicability data.

In some embodiments the method 900 may further comprise receiving the plurality of test procedures from the plurality of source code providers, the plurality of executable code segments being provided within the plurality of test procedures. The method 900 may additionally comprise storing the plurality of test procedures for subsequent use.

TECHNICAL ADVANTAGES

Embodiments of the invention have a number of advantages. For example, utilizing the techniques discussed above, any suitable number of entities may provide test procedures for testing a given computing device's hardware, software, features, functionality, capabilities, or adherence to predefined protocols. Code segments corresponding to the test procedures (provided as part of the test procedures, or separately) may be used to determine whether a given test procedure is applicable (e.g., should be executed) to a given device's configuration. By executing the code segments and providing these code segments with or in the test procedures, a testing framework is provided that enables dynamic applicability management where applicability of various test procedures is determinable using any suitable code segment stored and accessible at the time.

As more and more test procedures are stored, the management system may execute newly added, corresponding code segments to assess the newly stored test procedures without any updates to the management system being necessary. By programmatically providing the rules for determining the applicability of a test procedure, processing resources of the testing platform and the device being tested are preserved as the higher risk associated with conventional, human managed, applicability rules are reduced. In the disclosed techniques, the logic for determining applicability is provided by the test procedure provider, the entity most knowledgeable about the test procedure's applicability, instead of less-informed parties attempting to manually generate such rules from textual explanations as found in conventional testing frameworks. Additionally, through programmatically providing the applicability logic, the risk of incorrectly identifying that a test procedure is not applicable to a given device configuration is reduced, which in turn reduces the risk of missing test coverage where hardware, software, features, functionality, capabilities, and/or protocol conformance of a given computing device are not tested. Additionally, by encapsulating the application logic within a test procedure, the disclosed techniques ensure that any errors within one code segment do not affect the logic of another. This is a large improvement over conventional systems which stored rules together and therefore experienced an increased risk that changes to or errors in one rule would affect the execution of others.

Any of the computing devices described herein may be an example of a computer system that may be used to implement any of the entities or components described above. The subsystems of such a computer system may be interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations, or method steps. In some embodiments, the functions, processes, operations, or method steps may be implemented as a result of the execution of a set of instructions or software code by a suitably programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, JAVA, C++ or PERL using, for example, conventional or object-oriented techniques. The software code may be stored as a series of instructions, or commands on a computer-readable medium, such as a random-access memory (RAM), a read-only memory (ROM), a magnetic medium such as a hard-drive or a floppy disk, or an optical medium such as a CD-ROM. Any such computer-readable medium may reside on or within a single computational apparatus and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
  obtaining, by a first computing device comprising a processor and a memory, a plurality of executable code segments of a plurality of test procedures that are associated with a plurality of source code providers, each of the plurality of executable code segments comprising a respective function having a common function name and a common input parameter list, each of the plurality of executable code segments being configured to receive, when executed, a respective set of device configuration parameters and output an indication that a corresponding test procedure of the plurality of test procedures is applicable to the set of input parameters;
  receiving, by the first computing device, a set of device configuration parameters associated with a second computing device;
  executing, by the first computing device using a plurality of functions sharing the common function name, the plurality of executable code segments, the plurality of executable code segments being individually provided the set of device configuration parameters associated with the second computing device as input;
  determining, by the first computing device from outputs returned from executing the plurality of executable code segments, a subset of outputs that indicate that a subset of the plurality of test procedures are applicable to the set of device configuration parameters; and
  causing a receiving device comprising a corresponding processor and a corresponding memory to execute the subset of the plurality of test procedures based at least in part on transmitting, by the first computing device to the receiving device, applicability data that identifies the subset of the plurality of test procedures, the receiving device being configured to request or initiate execution of the subset of the plurality of test procedures in response to receiving the applicability data from the first computing device.

2. The computer-implemented method of claim 1, wherein the set of device configuration parameters indicate one or more features supported by the second computing device.

3. The computer-implemented method of claim 1, wherein each of the plurality of executable code segments are obtained from a respective test procedure of the plurality of test procedures.

4. The computer-implemented method of claim 3, wherein each of the plurality of test procedures comprises corresponding machine-readable data identifying a set of instructions for performing a test or a simulation.

5. The computer-implemented method of claim 4, further comprising transmitting, to one or more computing devices, one or more machine-readable data instances comprising corresponding sets of instructions that individually correspond to the subset of the plurality of test procedures.

6. The computer-implemented method of claim 5, wherein the one or more computing devices comprise the second computing device and a testing platform computer, and wherein transmitting the one or more machine-readable data instances configures the second computing device and the testing platform computer to perform the simulation, the simulation testing functionality provided by the second computing device, the functionality corresponding to one or more capabilities purported to be supported by the second computing device.

7. The computer-implemented method of claim 6, wherein each of the plurality of test procedures comprises configuration data for configuring at least one of the second computing device or the testing platform computer to perform the simulation.

8. The computer-implemented method of claim 1, wherein the applicability data comprises the subset of the plurality of test procedures.

9. The computer-implemented method of claim 1, wherein the plurality of test procedures are provided by one or more test procedure provider computers.

10. The computer-implemented method of claim 9, wherein each of the one or more test procedure provider computers are associated with differing entities.

11. A management computer, comprising:
  one or more processors; and
  one or more memories that store computer-executable instructions that, when executed by the one or more processors, cause the management computer to:
    obtain a plurality of executable code segments of a plurality of test procedures that are associated with a plurality of source code providers, each of the plurality of executable code segments comprising a respective function having a common function name and a common input parameter list, each of the plurality of executable code segments being configured to receive, when executed, a respective set of device configuration parameters and output an indication that a corresponding test procedure of the plurality of test procedures is applicable to the set of input parameters;

receive a set of device configuration parameters associated with a computing device;

execute, using a plurality of functions sharing the common function name, the plurality of executable code segments, the plurality of executable code segments being individually provided the set of device configuration parameters associated with the computing device as input;

determine, from outputs obtained from executing the plurality of executable code segments, a subset of outputs that indicate that a subset of the plurality of test procedures are applicable to the set of device configuration parameters; and cause a receiving device comprising a corresponding processor and a corresponding memory to execute the subset of the plurality of test procedures based at least in part on transmitting to the receiving device, applicability data that identifies the subset of the plurality of test procedures, the receiving device being configured to request or initiate execution of the subset of the plurality of test procedures in response to receiving the applicability data.

12. The management computer of claim 11, wherein the set of device configuration parameters comprise at least one of: a hardware component, a software component, a feature, a capability, or a protocol associated with a configuration of the computing device.

13. The management computer of claim 11, wherein executing the computer-executable instructions further causes the management computer to:

receive the plurality of test procedures from the plurality of source code providers, the plurality of executable code segments being provided within the plurality of test procedures; and store the plurality of test procedures for subsequent use.

14. The management computer of claim 11, wherein the set of device configuration parameters are received by at least one of: the computing device to be tested or a testing platform computer that is configured to execute one or more tests with the computing device to be tested.

15. The management computer of claim 11, wherein executing the plurality of executable code segments associated with the plurality of source code providers comprises:

accessing a first test procedure of the plurality of test procedures;

executing a first code segment of the first test procedure;

storing a first output obtained from executing the first code segment;

accessing a second test procedure of the plurality of test procedures;

executing a second code segment of the second test procedure; and storing a second output obtained from executing the second code segment.

16. The management computer of claim 11, wherein the receiving device that receives the applicability data is a testing platform computer that initiates a test with the computing device based at least in part on receiving the applicability data.

17. The management computer of claim 11, wherein a given test procedure of the plurality of test procedures specifies one or more configuration settings for a respective computing device that participates in a corresponding test.

18. The management computer of claim 11, wherein each of the plurality of executable code segments encapsulates conditional logic for determining a corresponding test procedures applicability with respect to a device configuration of the computing device, the device configuration being specified by the set of device configuration parameters.

19. The management computer of claim 11, wherein at least one test procedure of the plurality of test procedures is associated with executing a simulation using a testing platform computer to simulate a legitimate data exchange with the computing device.

* * * * *